US012613034B1

(12) United States Patent
Gao et al.

(10) Patent No.: US 12,613,034 B1
(45) Date of Patent: Apr. 28, 2026

(54) CERAMIC MATRIX COMPOSITE COMPONENT WITH CORRUGATED WALL

(71) Applicant: RTX CORPORATION, Farmington, CT (US)

(72) Inventors: Cheng Gao, South Glastonbury, CT (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/040,206

(22) Filed: Jan. 29, 2025

(51) Int. Cl.
| | |
|---|---|
| *F23R 3/00* | (2006.01) |
| *F01D 11/08* | (2006.01) |
| *F01D 25/12* | (2006.01) |
| *F02C 7/12* | (2006.01) |

(52) U.S. Cl.
CPC .............. *F23R 3/007* (2013.01); *F01D 11/08* (2013.01); *F01D 25/12* (2013.01); *F02C 7/12* (2013.01); *F05D 2300/6033* (2013.01); *F23R 3/002* (2013.01); *F23R 2900/00018* (2013.01)

(58) Field of Classification Search
CPC ...................... F23R 3/002; F23R 3/007; F23R 2900/00018; F02C 7/12; F01D 11/08; F01D 11/24; F01D 25/005; F01D 25/12; F01D 25/246; F01D 9/04; F01D 9/041; F01D 9/042; F05D 2300/5021; F05D 2300/50212; F05D 2300/6033; F05D 2300/6034; F05D 2240/11; F05D 2250/182; F05D 2260/22141
See application file for complete search history.

(56) References Cited

U.S. PATENT DOCUMENTS

| | | | | |
|---|---|---|---|---|
| 5,353,865 | A * | 10/1994 | Adiutori ............... | F28F 13/185 |
| | | | | 165/908 |
| 6,402,464 | B1 * | 6/2002 | Chiu ....................... | F01D 5/288 |
| | | | | 415/116 |
| 7,988,410 | B1 * | 8/2011 | Liang ....................... | F01D 9/04 |
| | | | | 415/173.1 |
| 8,439,629 | B2 * | 5/2013 | Pietraszkiewicz ........ | F02C 7/18 |
| | | | | 415/173.1 |
| 8,439,634 | B1 * | 5/2013 | Liang ....................... | F01D 11/10 |
| | | | | 415/173.1 |
| 8,475,122 | B1 * | 7/2013 | Liang ....................... | F01D 11/10 |
| | | | | 415/173.1 |
| 9,103,225 | B2 * | 8/2015 | Lutjen ..................... | F01D 11/08 |
| 10,513,943 | B2 | 12/2019 | McCaffrey | |
| 10,550,710 | B2 | 2/2020 | VanTassel et al. | |
| 10,641,099 | B1 | 5/2020 | Waite et al. | |
| 11,365,635 | B2 * | 6/2022 | Read ....................... | F01D 5/147 |

(Continued)

FOREIGN PATENT DOCUMENTS

WO          2003062607  A1      7/2003

*Primary Examiner* — William H Rodriguez
(74) *Attorney, Agent, or Firm* — Millen, White, Zelano & Branigan, P.C.; Brion P. Heaney

(57)                   ABSTRACT

The disclosure describes CMC components having structures which ameliorate stress induced by thermal expansion and methods for manufacturing CMC components with such structures. The CMC component, for example, a blade outer air seals (BOAS) is provided with a cooling cavity having a cavity top wall. The cavity top wall is provided with curvatures, such as corrugations or dimples, that allow the cavity top wall to expand and thereby reduce stress induced by thermal expansion.

20 Claims, 5 Drawing Sheets

(56)         References Cited

U.S. PATENT DOCUMENTS

| | | | |
|---|---|---|---|
| 2002/0056277 A1* | 5/2002 | Parry | F23R 3/08 |
| | | | 60/752 |
| 2004/0194941 A1* | 10/2004 | Larrieu | F02K 9/64 |
| | | | 165/170 |
| 2005/0077341 A1* | 4/2005 | Larrieu | F02K 9/972 |
| | | | 228/193 |
| 2006/0140753 A1* | 6/2006 | Romanov | F01D 25/12 |
| | | | 415/173.1 |
| 2008/0211192 A1* | 9/2008 | Pietraszkiewicz | F01D 11/08 |
| | | | 277/347 |
| 2013/0055722 A1* | 3/2013 | Verhiel | F23R 3/60 |
| | | | 60/752 |
| 2013/0323033 A1* | 12/2013 | Lutjen | F01D 1/02 |
| | | | 415/173.1 |
| 2016/0194980 A1* | 7/2016 | Thomen | F02C 7/12 |
| | | | 415/115 |
| 2016/0238249 A1* | 8/2016 | Cunha | F23R 3/06 |
| 2016/0312643 A1* | 10/2016 | Davis | F01D 5/12 |
| 2016/0370008 A1* | 12/2016 | Drake | F23R 3/005 |
| 2019/0218925 A1* | 7/2019 | Garay | F01D 11/08 |
| 2019/0309643 A1* | 10/2019 | Barker | F01D 11/122 |
| 2019/0368369 A1* | 12/2019 | Liang | F01D 25/005 |
| 2020/0040751 A1* | 2/2020 | Barker | F01D 11/005 |
| 2020/0040756 A1* | 2/2020 | Clark | F01D 11/08 |
| 2020/0072084 A1* | 3/2020 | Blaney | F01D 25/246 |
| 2020/0149477 A1* | 5/2020 | Barker | F02C 7/28 |
| 2020/0173299 A1* | 6/2020 | Barker | F01D 11/125 |
| 2021/0079804 A1* | 3/2021 | Clark | F01D 11/08 |
| 2021/0199013 A1* | 7/2021 | Read | B32B 18/00 |

* cited by examiner

CERAMIC MATRIX COMPOSITE COMPONENT WITH CORRUGATED WALL

FIELD OF THE INVENTION

The present disclosure relates generally to methods for manufacturing ceramic matrix composites (CMCs). In particular, the present disclosure concerns manufacturing CMC components with structures to relieve stress induced by thermal expansion.

BACKGROUND OF THE INVENTION

Gas turbine engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such flow path components be made of heat resistant materials, for example, superalloys and ceramic matrix composites (CMCs). While these materials are heat resistant, to increase the operational lifespan of turbine engine components these materials can be provided with structures to permit the flow of cooling fluid (e.g., cooling air) to interact with and cool the component.

While CMC materials can withstand much higher operating temperatures than components composed of superalloys, CMCs have comparably lower thermal conductivity than superalloys. Thus, it is particularly desirable to take steps to efficiently cool CMC components using available cooling air flows. For example, CMC components can be provided with cooling cavities to allow cooling air to penetrate into the interior of the CMC component and provide cooling thereof.

Thus, one area of a CMC component can be exposed to the high-energy, high temperature gas flow while another area can be exposed to the flow of cooling air. As a result, temperature gradients can form within the CMC component leading parts of the CMC component undergoing different rates of thermal expansion which in turn can lead to the formation of stresses within the component.

There is thus a continuing need to provide alternative and/or improved cooling structures and methods for manufacturing such cooling structures in CMC to allow for efficient and effective cooling of CMC components exposed to high temperature gas flow while also alleviating stresses resulting from thermal expansion.

SUMMARY OF THE INVENTION

In general, the present disclosure relates to CMC components having structures which ameliorate stress induced by thermal expansion and methods for manufacturing CMC components with such structures, particularly structures for CMC components such as blade outer air seals (BOAS) that provide for expansion to reduce stress.

The present disclosure is directed, in a first aspect, to a ceramic matrix composite component comprising:

a ceramic matrix composite substrate comprising ceramic fiber tows within a ceramic matrix, the substrate having a bottom surface and an upper surface; and a cooling cavity within an interior region of the substrate, the cooling cavity being defined by a cavity bottom wall, a cavity top wall, and cavity side walls;

wherein the cavity top wall is provided with curvatures to allow for expansion of the cavity top wall of the substrate.

The present disclosure is also directed, in a further aspect, to a method of preparing a ceramic matrix composite comprising:

providing a ceramic matrix composite preform comprising a preform substrate having ceramic fiber tows, the preform substrate having a bottom surface and an upper surface;

forming a cooling cavity within the preform, the cooling cavity being defined by a cavity bottom wall, a cavity top wall, and cavity side wall; and wherein the cavity top wall is provided with curvatures to allow for expansion of the cavity top wall of the substrate; and subjecting the preform to densification to form the ceramic matrix composite.

The present disclosure is further directed, in an additional aspect, to a turbine engine comprising:

a fan section, a compressor section, a combustion chamber, and a turbine section, the turbine section including at least one rotor and one or more turbine blade(s) extending radially outwardly from the at least one rotor; and a blade outer air seal assembly positioned between the one or more turbine blade(s) and an outer casing to the engine;

wherein the blade outer air seal assembly is formed of a plurality blade outer air seal segments, wherein each blade outer air seal segment comprises:

a ceramic matrix composite substrate comprising ceramic fiber tows within a ceramic matrix, the substrate having a bottom surface and an upper surface; and a cooling cavity within an interior region of the substrate, the cooling cavity being defined by a cavity bottom wall, a cavity top wall, and cavity side walls;

wherein the cavity top wall is provided with curvatures to allow for expansion of the cavity top wall of the substrate.

In further embodiments of the present disclosure, including further embodiments of the above exemplary embodiments, the base is made of a SiC/SiC composite.

In further embodiments of the present disclosure, including further embodiments of the above exemplary embodiments, the curvatures are in the form of corrugations.

In further embodiments of the present disclosure, including further embodiments of the above exemplary embodiments, the corrugations have a uniform height.

In further embodiments of the present disclosure, including further embodiments of the above exemplary embodiments, the corrugations have heights that vary.

In further embodiments of the present disclosure, including further embodiments of the above exemplary embodiments, the distance between adjacent corrugations is uniform.

In further embodiments of the present disclosure, including further embodiments of the above exemplary embodiments, the distance between adjacent corrugations varies.

In further embodiments of the present disclosure, including further embodiments of the above exemplary embodiments, the substrate has an axial direction and a circumferential direction perpendicular to the axial direction, and the corrugations extend in the circumferential direction.

In further embodiments of the present disclosure, including further embodiments of the above exemplary embodiments, the substrate has an axial direction and a circumferential direction perpendicular to the axial direction, and the corrugations extend in the axial direction.

In further embodiments of the present disclosure, including further embodiments of the above exemplary embodiments, the curvatures are in the form of dimples.

In further embodiments of the present disclosure, including further embodiments of the above exemplary embodiments, the dimples have a uniform height.

In further embodiments of the present disclosure, including further embodiments of the above exemplary embodiments, the dimples have heights that vary.

In further embodiments of the present disclosure, including further embodiments of the above exemplary embodiments, the distance between adjacent dimples is uniform.

In further embodiments of the present disclosure, including further embodiments of the above exemplary embodiments, the distance between adjacent dimples varies.

In further embodiments of the present disclosure, including further embodiments of the above exemplary embodiments, the CMC component further comprises at least one cooling air inlet to permit cooling air to enter the cooling cavity and at least one cooling air outlet to permit cooling air to be discharged from the cooling cavity.

In further embodiments of the present disclosure, including further embodiments of the above exemplary embodiments, the component is a combustor liner.

In further embodiments of the present disclosure, including further embodiments of the above exemplary embodiments, the component is a blade outer air seal (BOAS) segment.

In further embodiments of the present disclosure, including further embodiments of the above exemplary embodiments, the component is BOAS assembly comprising a plurality of BOAS segments arranged to form an annular shaped structure.

In further embodiments of the present disclosure, including further embodiments of the above exemplary embodiments, the curvatures of the cavity top wall formed in the preform using tooling or sacrificial materials that are removed before any densification, after an initial pre-densification, or after a final densification.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

4

Figures 3A, 3B:
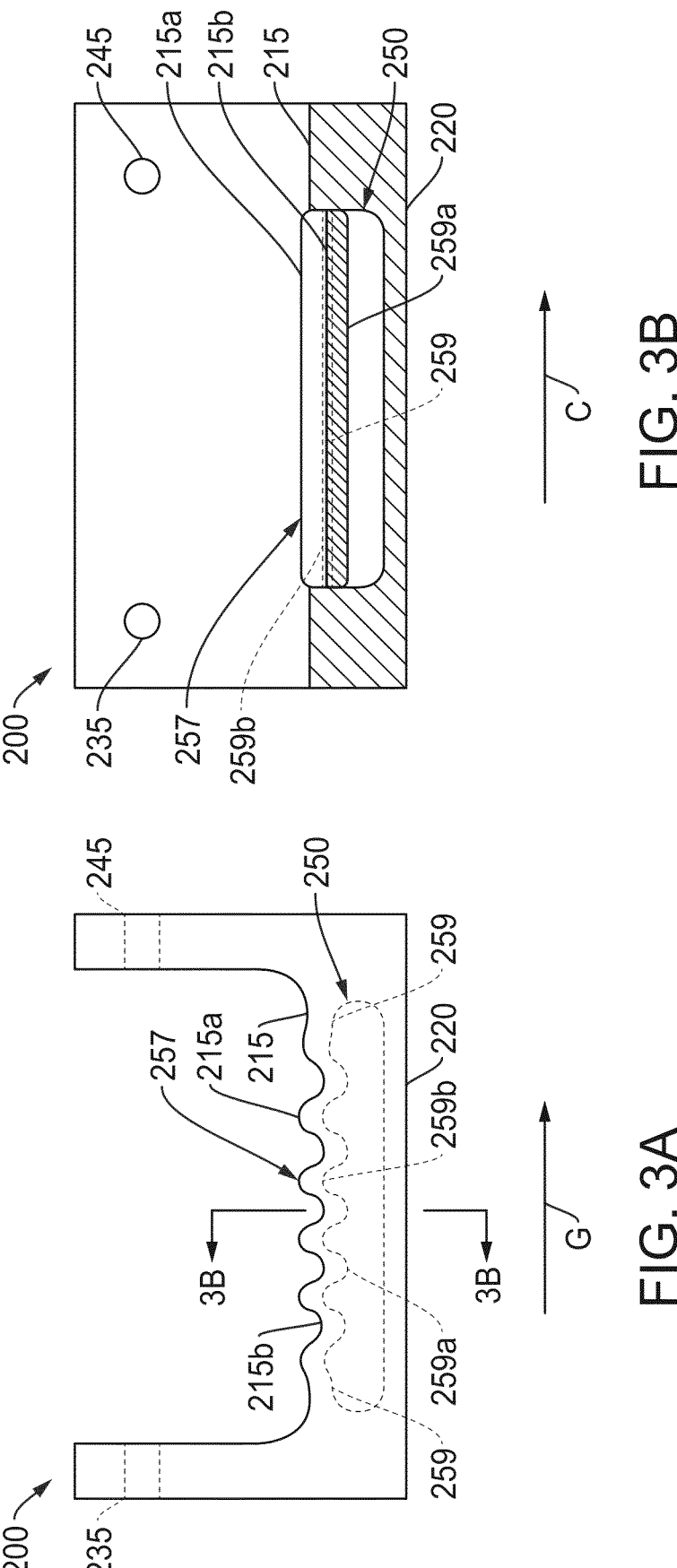
Figures 4A, 4B:
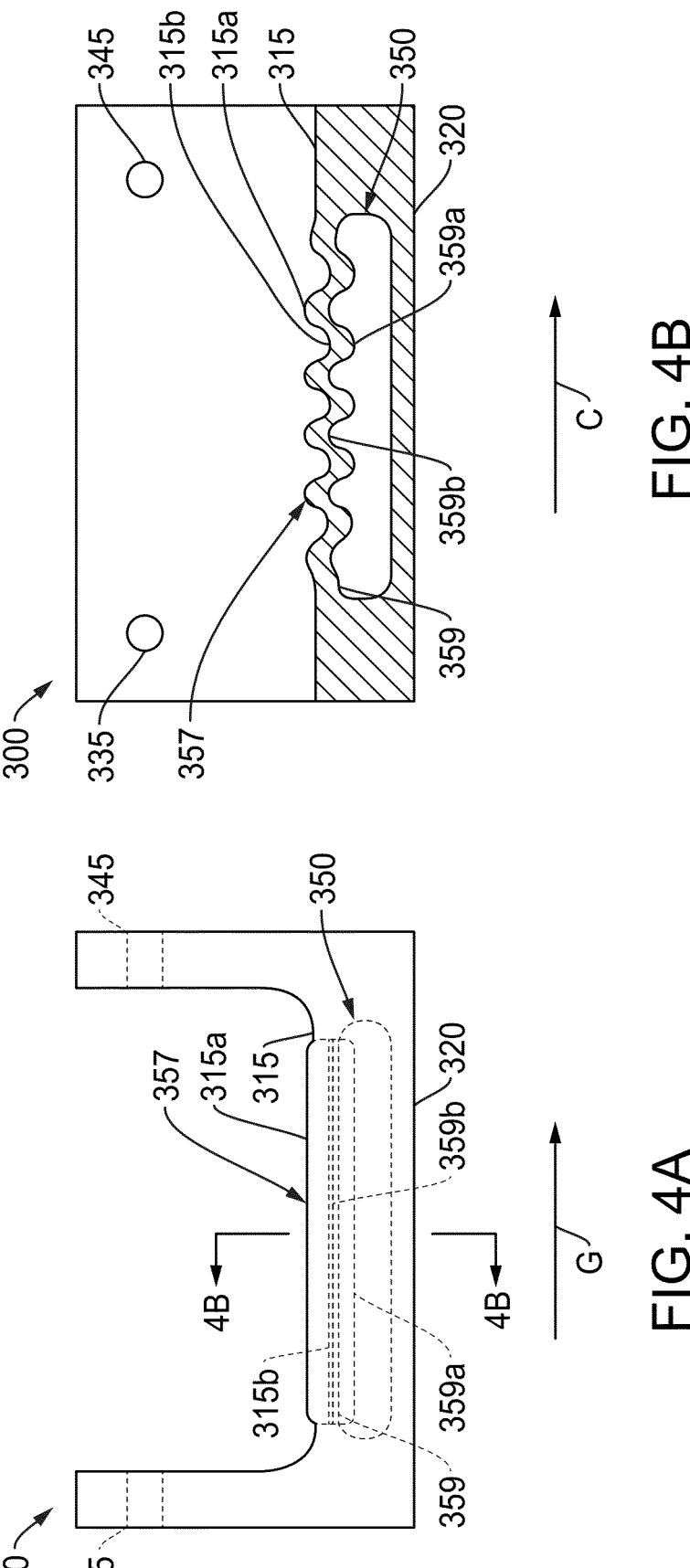
Figures 5A, 5B:
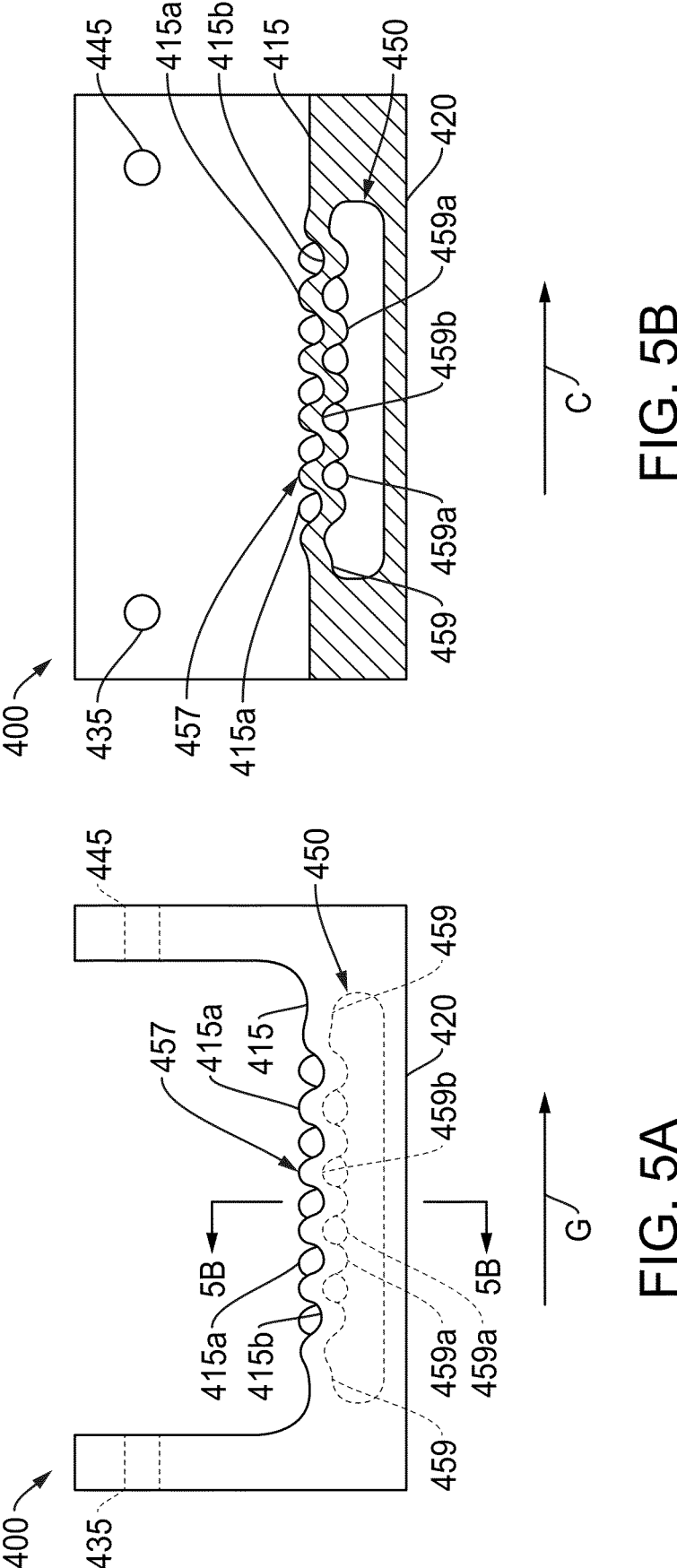

FIG. 3A is a side view of an embodiment of a BOAS segment having a corrugated outer radial wall in accordance with the present disclosure;

FIG. 3B is a cross sectional view of the BOAS segment of FIG. 3A along line 3B-3B;

FIG. 4A is a side view of another embodiment of a BOAS segment having a corrugated outer radial wall in accordance with the present disclosure;

FIG. 4B is a cross sectional view of the BOAS segment of FIG. 4A along line 4B-4B;

FIG. 5A is a side view of a further embodiment of a BOAS segment having a corrugated outer radial wall in accordance with the present disclosure; and FIG. 5B is cross sectional view of the BOAS segment of FIG. 5A along line 5B-5B.

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often makes reference to BOAS and BOAS segments, it should be recognized that the present disclosure is not limited to BOAS but includes other CMC components used within jet engines that may be exposed to high temperature gas flows, for example, other seals, and combustor liners.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that the faces in the direction away from the flow of the hot gases, i.e., faces downstream.

Figure 1:
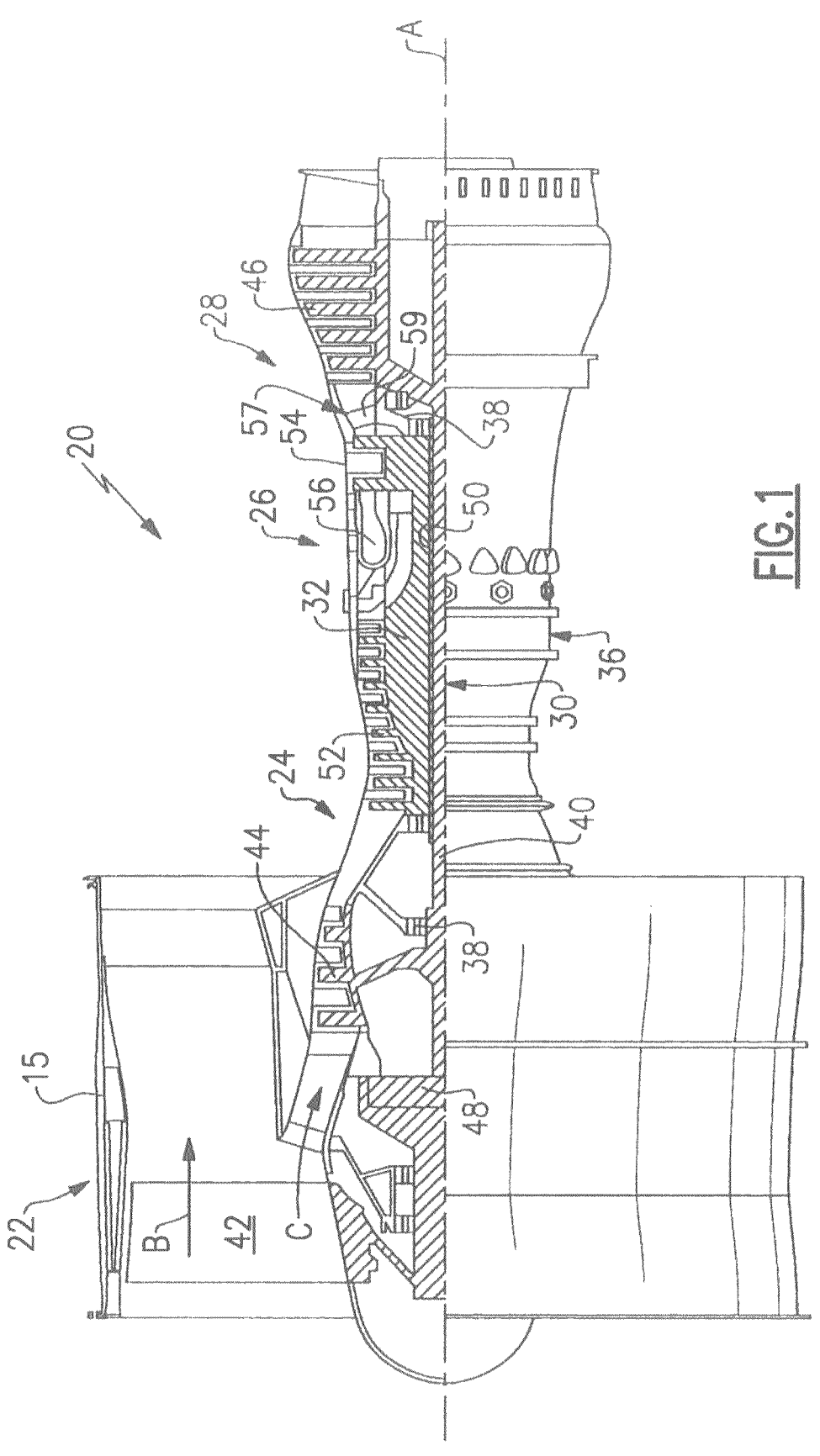
FIG. 1 schematically illustrates a partial cross section of an exemplary gas turbine engine.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, jet engine components, such as BOAS, BOAS segments, other seals, vane airfoils and platforms therefor, blade airfoils and platforms therefor, and combustor liners, can be made from CMC materials. In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows or can be woven or braided fiber tows. For example, the fibers tows can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filing the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), melt infiltration (MI), for example, reactive melt infiltration (RMI) (such as liquid silicon infiltration (LSI)), and polymer infiltration and pyrolysis (PIP). Multiple processes can be used during densification. For example, the preform can be initially subjected to a pre-densification such as CVI during which the preform is partially densified, which is then followed by a further densification such as MI to improve the matrix density.

Figure 2:
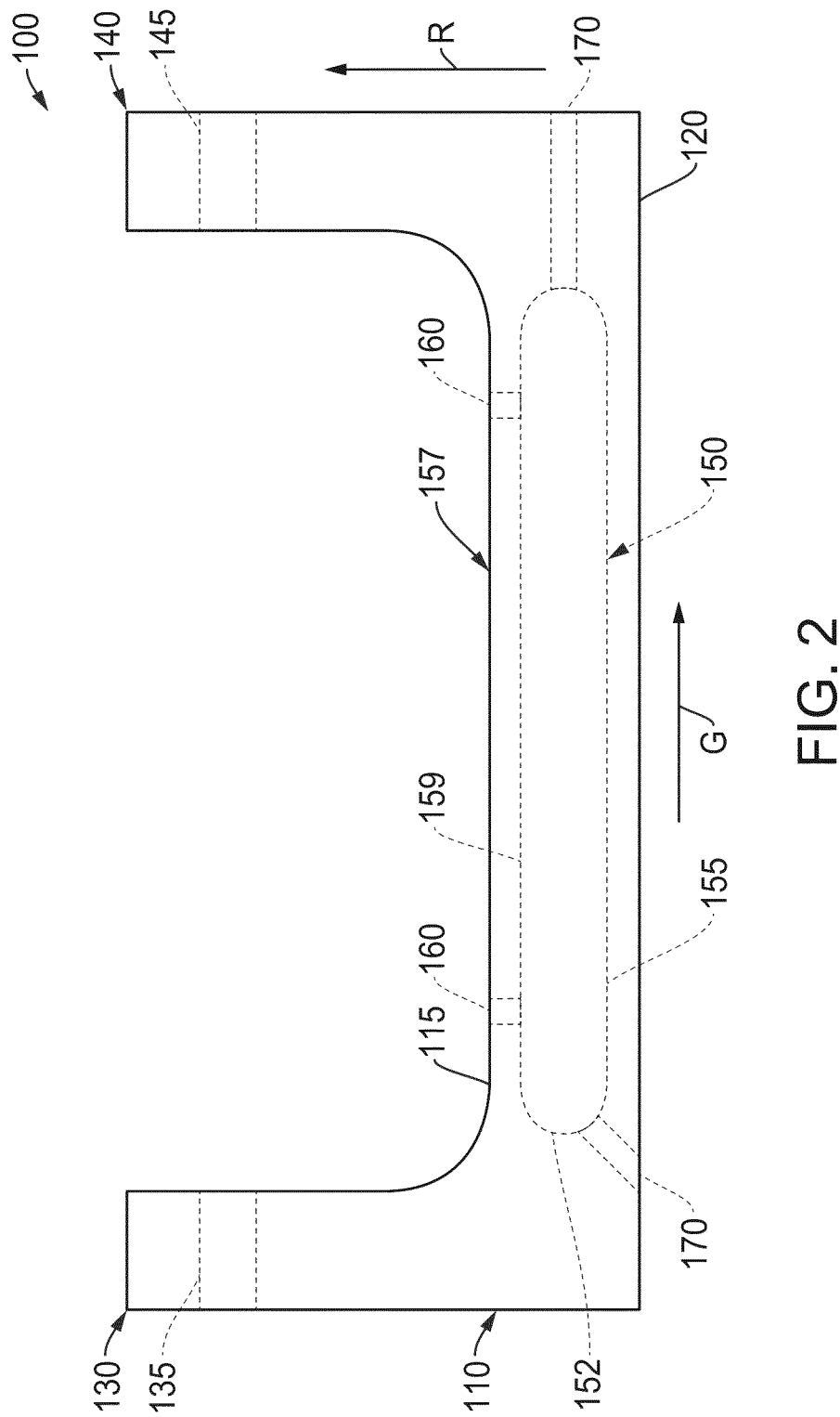
FIG. 2 is a sideview of a blade outer air seal (BOAS) segment.

FIG. 2 illustrates a side view of a CMC component, specifically a blade outer air seal (BOAS) segment 100. In this figure, direction R indicates the radial direction, direction G indicates the axial direction or the direction of flow of hot gases through an engine, and the circumferential direction is perpendicular to the plane of the view. The segment 100 includes a base 110 having a radial outer surface 115 and a radial inner surface 120. Segment 100 further includes a forward flange structure 130 and an aft flange structure 140. These two flange structures each extend from the radial outer surface 115 of the base 110. Flange structures 130, 140 are load bearing features and provide means for attaching the CMC component to another structure, for example, the outer casing of an engine. Openings 135 and 145 in flanges 130 and 140, respectively, can be used for accommodating pins that can be used in attaching the CMC component to another structure. The base 110 and flanges structures 130, 140 are made of a CMC material comprising a plurality of ceramic fiber piles and a ceramic matrix.

The base 110 is also provided with a cooling cavity 150 in an interior region of the base 110. The cooling cavity 150 is defined by cavity side walls 152, a cavity bottom wall 155, and a cavity top wall 157. The depth of the cooling cavity 150 can vary. For example, the depth can be 0.02 inches to 0.2 inches such as 0.05 to 0.15 inches or 0.05 to 0.10 inches or 0.075 to 0.15 inches. A section of the radial outer surface 115 forms an upper surface of the cavity top wall 157. The cavity top wall 157 further has a bottom surface 159 which faces the interior of cooling cavity 150. Additionally, the cooling cavity 150 can be provided with one or more cooling air inlets 160 to allow for the introduction of cooling air form a region above radial outer surface 115 into the cooling cavity, and one or more the cooling air outlets 170 to provide for the discharge of cooling air from cooling cavity 150. Cooling air outlets 170 can have an outlet discharge opening that is in the radial inner surface 120 such that the discharged cooling air can provide a gas film cooling of radial inner surface 120. Alternatively, cooling air outlets 170 can have an outlet discharge opening in a side wall of the base 110 such that the discharged cooling air can provide a flow of cooling air to the region between adjacent BOAS segments.

The cooling cavity 150 can be formed in the base prior to densification of the CMC preform by precutting the fiber plies that are to be laid up to form the preform with a cavity or by cutting/drilling (machining) the cavity into the preform once the plies are laid up. Alternatively, the cooling cavity 150, and any cooling air inlets 160 and/or cooling air outlets 170, can be created by machining (e.g., drilling) after an initial pre-densification, such as by chemical vapor infiltration (CVI), or after final densification. A further alternative is to form the cooling cavity 150, cooling air inlets 160, and/or cooling air outlets 170 during layup using tooling or sacrificial material that is removed before any densification, after initial pre-densification, e.g., by chemical vapor infiltration (CVI), or after final densification.

FIGS. 3A and 3B show an embodiment of a BOAS segment 200 in accordance with the present disclosure having a corrugated outer radial wall. As in FIG. 2, the base and flanges structures of BOAS segment 200 are made of a CMC material comprising a plurality of ceramic fiber piles and a ceramic matrix. The segment 200 includes a base having a radial outer surface 215 and a radial inner surface 220. Segment 200 further includes a forward flange structure and an aft flange structure. Openings 235 and 245 in the forward and aft flanges, respectively, can be used for accommodating pins that can be used in attaching the CMC component to another structure. FIG. 3A shows a side view of BOAS segment 200 and FIG. 3B shows a cross section along line 3B-3B of FIG. 3A. As best seen in FIG. 3A, the cavity top wall 257 of cooling cavity 250 is corrugated. Thus, the section of the radial outer surface 215 that forms an upper surface of the cavity top wall 257 has peaks 215a and valleys 215b. Similarly, the bottom surface 259 of the cavity top wall 257 has peaks 259a and valleys 259b. In FIG. 3B the circumferential direction is shown by arrow C. As can be seen in FIG. 3B, the corrugations extend in the circumferential direction. That is, the peaks 215a and 259a extend in the in the circumferential direction. As indicated in FIG. 2, the cooling cavity 250 can be provided with one or more cooling air inlets and one or more cooling air outlets (not shown).

In operation, the radial inner surface 220 will be exposed to the high-energy, high temperature gas flow generated by the jet engine's combustion section. On the other hand, the radial outer surface 215 will be exposed to a flow of cooling air. This can create a thermal gradient within the component. As a result, the region of the component adjacent the radial inner surface 220 ("hot wall") will experience a greater degree of thermal expansion than the region of the component adjacent the radial outer surface 215 ("cold wall") resulting in stress formation.

However, in the component of FIGS. 3A and 3B, when the hot wall region undergoes thermal expansion, the corrugations in the cavity top wall 257 will allow this cold wall region to expand (in the axial direction) in a comparable manner thereby reducing the stress induced by differential thermal expansion of the hot wall and cold wall regions.

The corrugations as shown in FIGS. 3A and 3B are in the form of a periodic sine wave. Thus, the peaks have a uniform amplitude (maximum height of a peak) and a uniform distance between adjacent peaks. However, the corrugations can also exhibit varying amplitudes (i.e., adjacent peaks 215a (or 259a) can have different amplitudes) and/or the distances between adjacent peaks 215a (or 259a) can vary. Factors which can impact the amplitude and/or the distance between peaks are the thickness of the cavity top wall 257 and the depth of the cooling cavity 250. Also, the minimum bend radius of the fabric (e.g., 0.0125 inches) will impact the curves formed by the corrugations.

The circumferentially aligned corrugations of FIGS. 3A and 3B provide a further advantage in that they stiffness in the circumferential direction to prevent bending. The circumferentially aligned corrugations can behave similar to ribs to alleviate induced bending.

As discussed above, the cooling cavity 250 can be formed can be formed in the base prior to densification of the CMC preform by precutting the fiber plies that are to be laid up to form the preform with a cavity or by cutting/drilling (machining) the cavity and any associated cooling inlets and/or outlets into the preform once the plies are laid up. Alternatively, the cooling cavity 250 and any associated cooling inlets and/or outlets can be formed during layup using tooling or sacrificial materials that are removed before any densification, after initial pre-densification, e.g., by chemical vapor infiltration (CVI), or after final densification. The corrugations of the cavity top wall 257 can be formed in the preform using tooling or sacrificial materials that are removed before any densification, after initial pre-densification, e.g., by chemical vapor infiltration (CVI), or after final densification.

FIGS. 4A and 4B show another embodiment of a BOAS segment 300 in accordance with the present disclosure having a corrugated outer radial wall. The segment 300 includes a base having a radial outer surface 315 and a radial inner surface 320. Segment 300 further includes a forward flange structure and an aft flange structure. Openings 335 and 345 in the forward and aft flanges, respectively, can be used for accommodating pins that can be used in attaching the CMC component to another structure. As best seen in FIG. 4B, the top wall 357 of cooling cavity 350 is corrugated. Thus, the section of the radial outer surface 315 that forms an upper surface of the cavity top wall 357 has peaks 315a and valleys 315b. Similarly, the bottom surface 359 of the cavity top wall 357 has peaks 359a and valleys 359b. FIG. 4A shows a side view of BOAS segment 300 and FIG. 4B shows a cross section along line 4B-4B of FIG. 4A. That is, the peaks 315a and 359a extend in the in the radial direction. As can be seen in FIG. 4A, the corrugations extend in the axial direction G. As indicated in FIG. 2, the cooling cavity 350 can be provided with one or more cooling air inlets and one or more cooling air outlets (not shown). The corrugations of the cavity top wall 357 can be formed in the preform using tooling or sacrificial materials that are removed before any densification, after initial pre-densification, e.g., by chemical vapor infiltration (CVI), or after final densification.

The corrugations as shown in FIGS. 4A and 4B are in the form of a periodic sine wave. Thus, the peaks have a uniform amplitude (maximum height of a peak) and a uniform distance between adjacent peaks. However, the corrugations can also exhibit varying amplitudes (i.e., adjacent peaks 315*a* (or 359*a*) can have different amplitudes) and/or the distances between adjacent peaks 315*a* (or 359*a*) can vary. As mentioned above, factors which can impact the amplitude and/or the distance between peaks are the thickness of the cavity top wall 357, the depth of the cooling cavity 350, and the minimum bend radius of the fabric (e.g., 0.0125 inches).

In operation, the radial inner surface 320 will be exposed to the high-energy, high temperature gas flow generated by the jet engine's combustion section. On the other hand, the radial outer surface 315 will be exposed to a flow of cooling air. As a result, the thermal gradient that forms, the region of the component adjacent the radial inner surface 320 ("hot wall") will experience a greater degree of thermal expansion than the region of the component adjacent the radial outer surface 315 ("cold wall") resulting in stress formation. However, in the component of FIGS. 4A and 4B, when the hot wall region undergoes thermal expansion, the corrugations in the cavity top wall 357 will allow this cold wall region to expand (in the circumferential direction) in a comparable manner thereby reducing the stress induced by differential thermal expansion of the hot wall and cold wall regions.

The axially aligned corrugations of FIGS. 4A and 4B provide a further advantage in that they provide stiffness in the radial direction to prevent bending. For example, a pressure differential within the component across the cold wall and the hot wall (i.e., a pressure delta from cooling air surface to the hot gas path surface) can induce a bending load on the component. The axially aligned corrugations can behave similar to ribs to alleviate this induced bending.

FIGS. 5A and 5B show a further embodiment of a BOAS segment 400 in accordance with the present disclosure. In this embodiment, an outer radial wall is provided with a series of dimples, rather than corrugations. These dimples will allow the outer radial wall to expand in both a radial direction and a circumferential direction. The segment 400 includes a base having a radial outer surface 415 and a radial inner surface 420. Segment 400 further includes a forward flange structure and an aft flange structure. Openings 435 and 445 in the forward and aft flanges, respectively, can be used for accommodating pins that can be used in attaching the CMC component to another structure. FIG. 5A shows a side view of BOAS segment 400 and FIG. 5B a cross section along line 5B-5B of FIG. 5A. As best seen in FIG. 5A, the top wall 457 of cooling cavity 450 is dimpled. Thus, the section of the radial outer surface 415 that forms an upper surface of the cavity top wall 457 has peaks 415*a* and valleys 415*b*. Similarly, the bottom surface 459 of the cavity top wall 457 has peaks 459*a* and valleys 459*b*.

Unlike the corrugations shown in FIGS. 3A/3B and 4A/4B, peaks 415*a* and 459*a* form a series of dimples in both the circumferential or radial directions. The dimples can have a amplitude (height) and a uniform distance between adjacent simples. However, the dimples can also exhibit varying amplitudes (i.e., adjacent peaks 415*a* (or 459*a*) can have different amplitudes) and/or the distances between adjacent peaks 415*a* (or 459*a*) can vary. As mentioned above, factors which can impact the amplitude and/or the distance between peaks are the thickness of the cavity top wall 457, the depth of the cooling cavity 450, and the minimum bend radius of the fabric (e.g., 0.0125 inches).

As discussed with respect to FIG. 2, the cooling cavity 450 can be provided with one or more cooling air inlets and one or more cooling air outlets (not shown). The curvatures (dimples) of the cavity top wall 457 can be formed in the preform using tooling or sacrificial materials that are removed before any densification, after initial pre-densification, e.g., by chemical vapor infiltration (CVI), or after final densification.

In operation, the radial inner surface 420 will be exposed to the high-energy, high temperature gas flow generated by the jet engine's combustion section and the radial outer surface 415 will be exposed to a flow of cooling air. As a result, the region of the component adjacent the radial inner surface 420 ("hot wall") will experience a greater degree of thermal expansion than the region of the component adjacent the radial outer surface 415 ("cold wall") resulting in stress formation. However, in the component of FIGS. 5A and 5B, when the hot wall region undergoes thermal expansion, the dimples in the cavity top wall 457 will allow this cold wall region to expand (in the circumferential direction) in a comparable manner thereby reducing the stress induced by differential thermal expansion of the hot wall and cold wall regions.

By providing the cavity top wall with curvatures (corrugations or dimples), the CMC component of the present disclosure provides an efficient means for ameliorating stress that form due to thermal gradients causing different expansion rates of regions within the CMC component. By reducing such stresses, the operation life of the CMC component can be extended.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component comprising:
   a ceramic matrix composite substrate comprising ceramic fiber tows within a ceramic matrix, the substrate having a bottom surface and an upper surface; and
   a cooling cavity within an interior region of the substrate, the cooling cavity being defined by a cavity bottom wall, a cavity top wall, and cavity side walls;
   wherein the cavity top wall is provided with curvatures to allow for expansion of the cavity top wall of the substrate.

2. The CMC component to according to claim 1, wherein the curvatures are in the form of corrugations.

3. The CMC component to according to claim 2, wherein the corrugations have a uniform height.

4. The CMC component to according to claim 2, wherein the corrugations have heights that vary.

5. The CMC component to according to claim 2, wherein the distance between adjacent corrugations is uniform.

6. The CMC component to according to claim 2, wherein the distance between adjacent corrugations varies.

7. The CMC component to according to claim 2, wherein the substrate has an axial direction and a circumferential direction perpendicular to the axial direction, and the corrugations extend in the circumferential direction.

8. The CMC component to according to claim 2, wherein the substrate has an axial direction and a circumferential direction perpendicular to the axial direction, and the corrugations extend in the axial direction.

9. The CMC component to according to claim 1, wherein the curvatures are in the form of dimples.

10. The CMC component to according to claim 9, wherein the dimples have a uniform height.

11. The CMC component to according to claim 2, wherein the dimples have heights that vary.

12. The CMC component to according to claim 9, wherein the distance between adjacent dimples is uniform.

13. The CMC component to according to claim 9, wherein the distance between adjacent dimples varies.

14. The CMC component according to claim 1, further comprising at least one cooling air inlet to permit cooling air to enter the cooling cavity and at least one cooling air outlet to permit cooling air to be discharged from the cooling cavity.

15. The CMC component to according to claim 1, wherein the component is a combustor liner.

16. The CMC component according to claim 1, wherein the component is a blade outer air seal (BOAS) segment.

17. A BOAS assembly comprising a plurality of BOAS segments according claim 16, wherein the BOAS segments are arranged to form an annular shaped structure.

18. A method of preparing a ceramic matrix composite comprising:

providing a ceramic matrix composite preform comprising a preform substrate having ceramic fiber tows, the preform substrate having a bottom surface and an upper surface;

forming a cooling cavity within the preform, the cooling cavity being defined by a cavity bottom wall, a cavity top wall, and cavity side wall; and wherein the cavity top wall is provided with curvatures to allow for expansion of the cavity top wall of the substrate; and subjecting the preform to densification to form the ceramic matrix composite.

19. The method according to claim 18, wherein the curvatures of the cavity top wall formed in the preform using tooling or sacrificial materials that are removed before any densification, after an initial pre-densification, or after a final densification.

20. A turbine engine comprising:

a fan section, a compressor section, a combustion chamber, and a turbine section, the turbine section including at least one rotor and one or more turbine blade(s) extending radially outwardly from the at least one rotor; and a blade outer air seal assembly positioned between the one or more turbine blade(s) and an outer casing to the engine;

wherein the blade outer air seal assembly is formed of a plurality blade outer air seal segments, wherein each blade outer air seal segment comprises:

a ceramic matrix composite substrate comprising ceramic fiber tows within a ceramic matrix, the substrate having a bottom surface and an upper surface; and a cooling cavity within an interior region of the substrate, the cooling cavity being defined by a cavity bottom wall, a cavity top wall, and cavity side walls;

wherein the cavity top wall is provided with curvatures to allow for expansion of the cavity top wall of the substrate.

* * * * *